US012434673B2

United States Patent
Kobayashi et al.

(10) Patent No.: US 12,434,673 B2
(45) Date of Patent: Oct. 7, 2025

(54) DRIVING SUPPORT APPARATUS, DRIVING SUPPORT METHOD, AND NON-TRANSITORY COMPUTER-READABLE STORAGE MEDIUM

(71) Applicants: TOYOTA JIDOSHA KABUSHIKI KAISHA, Toyota (JP); DENSO CORPORATION, Kariya (JP)

(72) Inventors: Makoto Kobayashi, Susono (JP); Yuusuke Izumi, Tokyo (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 117 days.

(21) Appl. No.: 18/476,460

(22) Filed: Sep. 28, 2023

(65) Prior Publication Data
US 2024/0109522 A1 Apr. 4, 2024

(30) Foreign Application Priority Data
Sep. 29, 2022 (JP) .................................. 2022-156766

(51) Int. Cl.
*B60T 7/22* (2006.01)
(52) U.S. Cl.
CPC ........... *B60T 7/22* (2013.01); *B60T 2201/022* (2013.01); *B60T 2210/32* (2013.01)
(58) Field of Classification Search
CPC ... B60T 7/22; B60T 2201/022; B60T 2210/32
USPC ........................................................ 701/70
See application file for complete search history.

(56) References Cited

U.S. PATENT DOCUMENTS

| | | | |
|---|---|---|---|
| 9,969,261 B2 | 5/2018 | Kodama | |
| 10,045,173 B1 | 8/2018 | Morimura et al. | |
| 10,106,157 B2 | 10/2018 | Sawada et al. | |
| 10,150,407 B2 | 12/2018 | Takahashi et al. | |
| 10,696,297 B2 | 6/2020 | Nguyen Van et al. | |
| 11,001,255 B2 | 5/2021 | Fukuman et al. | |
| 11,110,937 B2 | 9/2021 | Kinoshita et al. | |
| 2010/0030474 A1 | 2/2010 | Sawada | |
| 2019/0001968 A1 | 1/2019 | Yorifuji et al. | |

(Continued)

FOREIGN PATENT DOCUMENTS

| | | | | |
|---|---|---|---|---|
| JP | 3829627 B2 | * | 10/2006 | ............ B60W 30/08 |
| JP | 2010-030513 A | | 2/2010 | |
| JP | 2022-061388 A | | 4/2022 | |

*Primary Examiner* — Hai H Huynh
(74) *Attorney, Agent, or Firm* — Sughrue Mion, PLLC

(57) ABSTRACT

A driving support apparatus includes a surrounding sensor capable of detecting a first object which is a moving object present in a predetermined first area including a direct front of the own vehicle and a second object which is a moving object present in a predetermined second area including a front lateral area of the own vehicle; and a control unit configured to execute the autonomous braking control for automatically applying braking force to the own vehicle when a collision condition is satisfied, the collision condition being satisfied when there is a possibility that the own vehicle collides with a moving object. The control unit is configured to, when a target object which is a moving object satisfying the collision condition is the second object, reduce a magnitude of the braking force applied by the autonomous braking control, as compared to when the target object is the first object.

7 Claims, 9 Drawing Sheets

(56) References Cited

U.S. PATENT DOCUMENTS

2019/0344828 A1 11/2019 Omori et al.
2019/0389488 A1 12/2019 Yamada et al.

* cited by examiner

DRIVING SUPPORT APPARATUS, DRIVING SUPPORT METHOD, AND NON-TRANSITORY COMPUTER-READABLE STORAGE MEDIUM

BACKGROUND OF THE INVENTION

1. Field of the Invention

The present invention relates to a driving support apparatus, a driving support method, and a non-transitory computer-readable storage medium, each of which being capable of executing autonomous braking control for avoiding collision with or mitigating impact due to the collision with a moving object present in a front area and lateral areas of a vehicle.

2. Description of the Related Art

Conventionally, a driving support apparatus has been known which executes autonomous braking control for automatically applying braking force to a vehicle when an object (moving object) with a possibility of the vehicle colliding therewith is present around the vehicle.

For example, a driving control apparatus of Japanese Patent Application Laid-open No. 2022-61388 is configured to execute autonomous braking control when there is a possibility of the vehicle colliding with an object, and a predicted time until collision with the object (time predicted to be required to collide with the object) is less than or equal to a predetermined time threshold. Note that in Japanese Patent Application Laid-open No. 2022-61388, "object" and "autonomous braking control" are described as "cross-moving body" and "emergency braking control," respectively.

According to the driving control apparatus of Japanese Patent Application Laid-open No. 2022-61388, depending on a position of the object at the time when starting the autonomous braking control, there is a possibility that a driver of the vehicle may feel uncomfortable against an unnecessary increase in deceleration. That is, an area in which the driver can visually recognize an object is limited to a predetermined area. Therefore, when an object subject to the autonomous braking control (hereinafter, also referred to as a "target object") is located outside the driver's visually recognizable area, the autonomous braking control may be initiated (i.e., the braking force is automatically applied to the vehicle) without the driver recognizing the presence of the object. As a result, the driver may perceive an unnecessary increase in deceleration, making the driver feel uncomfortable.

SUMMARY OF THE INVENTION

The present invention is made in order to cope with the above-mentioned problem. That is, one object of the present invention is to provide a technology capable of executing autonomous braking control appropriately while reducing a possibility that a driver of a vehicle feels uncomfortable against an increase in deceleration due to the autonomous braking control.

According to at least one embodiment of the present invention, there is provided a driving support apparatus (hereinafter also referred to as "apparatus of the present invention") including: a surrounding sensor (11, 12, 13L, 13R) capable of detecting a first object and a second object, the first object being a moving object present in a predetermined first area (R1) including a direct front of an own vehicle, and the second object being a moving object present in a predetermined second area (R2) including front lateral areas of the own vehicle; and a control unit (10) configured to execute autonomous braking control for automatically applying braking force to the own vehicle when a collision condition is satisfied, the collision condition being satisfied in a case when there is a possibility that the own vehicle collides with a moving object.

The control unit is configured to, when a target object which is a moving object satisfying the collision condition is the second object (S770: Yes), reduce a magnitude of the braking force applied by the autonomous braking control, as compared to when the target object is the first object.

The first area includes the direct front of the own vehicle. Therefore, a possibility that the driver can visually recognize the first object (a moving object present in the first area) is relatively high. On the other hand, the second area includes the front lateral area of the own vehicle. Therefore, a possibility that the driver can visually recognize the second object (a moving object present in the second area) is relatively low. The present invention apparatus is configured to reduce the magnitude of the braking force applied by the autonomous braking control when a target object is the second object as compared to when a target object is the first object. With this configuration, when a target object is positioned in an "area in which a possibility that the driver can visually recognize the target object is relatively low," the braking force with a relatively small magnitude is applied to the own vehicle, and thus the magnitude of the deceleration does not increase significantly. Accordingly, even though the autonomous braking control is initiated without the driver being aware of the presence of the target object, a possibility that the driver feels uncomfortable against an increase in the deceleration due to the autonomous braking control can be reduced. Additionally, when a target object is positioned in an "area in which a possibility that the driver can visually recognize the target object is relatively high," the braking force with a relatively large magnitude is applied to the own vehicle. In this case, the driver is likely to anticipate that the autonomous braking control is to be executed against the target object and therefore, even though the autonomous braking control is initiated, a possibility that the driver feels uncomfortable against an increase in the deceleration due to the autonomous braking control can be reduced. Thus, the present invention apparatus makes it possible to reduce a possibility that the driver feels uncomfortable against an increase in the deceleration due to the autonomous braking control, while appropriately executing the autonomous braking control.

In one aspect of the present invention, the collision condition includes a condition that a collision-predicted time (TTC) is less than or equal to a predetermined time threshold (TTCth), the collision-predicted time being a time predicted to be required for the own vehicle to collide with a moving object, and the time threshold at a time when the target object is the second object is larger than the time threshold at a time when the target object is the first object.

With this configuration, when the target object is the second object, the collision condition is more likely to be satisfied compared to when the target object is the first object. Therefore, the autonomous braking control can be initiated at a relatively early timing. Consequently, even though the magnitude of the braking force applied to the own vehicle is relatively small, the autonomous braking control can be executed appropriately.

In one aspect of the present invention, the surrounding sensor includes a front sensor (11, 12) and a lateral sensor (13L, 13R), an area within which the front sensor is capable of detecting a moving object includes the first area, but does not include the second area, and an area within which the lateral sensor is capable of detecting a moving object includes at least the second area.

With this configuration, an area within which the front sensor is capable of detecting a moving object corresponds to the first area. Additionally, an area within which only the lateral sensors are capable of detecting a moving object corresponds to the second area. Therefore, by determining whether a target object is a moving object detected solely by the lateral sensors, it becomes possible to appropriately change the braking force applied by the autonomous braking control. Consequently, it becomes possible to reduce the possibility that the driver feels uncomfortable against the increase in the deceleration due to the autonomous braking control with a relatively simple configuration.

In one aspect of the present invention, when an orientation f a front-rear axis (A) of the own vehicle is defined as a reference orientation, the first area is positioned in an area within which a magnitude of an azimuth angle at a time when viewed from a front edge center portion of the own vehicle is less than or equal to a predetermined angle threshold (θth), and the second area is positioned in an area within which a magnitude of an azimuth angle at a time when viewed from the front edge center portion is larger than the angle threshold (θth).

With this configuration, by setting the angle threshold to an appropriate value, it becomes possible to set the first area as an area with a relatively high possibility of the driver being able to visually recognize the target object, as well as it becomes possible to set the second area as an area with a relatively low possibility of the driver being able to visually recognize the target object. Therefore, it becomes possible to reduce the possibility that the driver feels uncomfortable against the increase in the deceleration due to the autonomous braking control.

In one aspect of the present invention, when an area positioned in front of the own vehicle and defined by a first line (L1), a second line (L2), and a third line (L3) is defined as a specific area (Rs), the first line (L1) having a predetermined length, passing through a front edge portion (O) of the own vehicle in a vehicle width direction, and being arranged symmetric with respect to a front-rear axis (A) of the own vehicle, the second line (L2) extending from a left end of the first line to a traveling direction of the own vehicle or to a diagonally left front direction, and the third line (L3) extending from a right end of the first line to a traveling direction of the own vehicle or to a diagonally right front direction, the first area is positioned in the specific area, and the second area is positioned in a predetermined area excluding the specific area.

With this configuration, by setting the length of the first line to an appropriate value and setting directions in which the second line and the third line are extending to an appropriate direction, it becomes possible to set the first area as an area with a relatively high possibility of the driver being able to visually recognize the target object, as well as it becomes possible to set the second area as an area with a relatively low possibility of the driver being able to visually recognize the target object. Therefore, it becomes possible to reduce the possibility that the driver feels uncomfortable against the increase in the deceleration due to the autonomous braking control.

In one aspect of the present invention, the control unit (10) is configured to, when the collision condition is satisfied, execute the autonomous braking control by applying to the own vehicle braking force required to match a deceleration of the own vehicle with a target deceleration as the braking force; and when the target object is the second object, moderate a rate of change of the deceleration during a period in which the deceleration reaches the target deceleration, as compared to when the target object is the first object.

With this configuration, when the target object is the second object, the rate of change of the deceleration becomes moderate compared to when the target object is the first object. Therefore, it becomes possible to more reliably reduce the possibility that the driver feels uncomfortable against the increase in the deceleration due to the autonomous braking control.

According to at least one embodiment of the present invention, there is provided a driving support method including: detecting a first object and a second object, the first object being a moving object present in a predetermined first area (R1) including a direct front of an own vehicle, and the second object being a moving object present in a predetermined second area (R2) including front lateral areas of the own vehicle; executing autonomous braking control for automatically applying braking force to the own vehicle when a collision condition is satisfied, the collision condition being satisfied in a case when there is a possibility that the own vehicle collides with a moving object; and when a target object which is a moving object satisfying the collision condition is the second object (S770: Yes), reducing a magnitude of the braking force applied by the autonomous braking control, as compared to when the target object is the first object (S750: Yes).

According to at least one embodiment of the present invention, there is provided a non-transitory computer-readable storage medium strong a driving support program for causing a computer to execute processing including: detecting a first object and a second object, the first object being a moving object present in a predetermined first area (R1) including a direct front of an own vehicle, and the second object being a moving object present in a predetermined second area (R2) including front lateral areas of the own vehicle;

executing autonomous braking control for automatically applying braking force to the own vehicle when a collision condition is satisfied, the collision condition being satisfied in a case when there is a possibility that the own vehicle collides with a moving object; and when a target object which is a moving object satisfying the collision condition is the second object (S770: Yes), reducing a magnitude of the braking force applied by the autonomous braking control, as compared to when the target object is the first object (S750: Yes).

In the above description, in order to facilitate understanding of the invention, a reference symbol used in an embodiment of the present invention is enclosed in parentheses and is assigned to each of the constituent features of the invention corresponding to the embodiment. However, each of the constituent features of the invention is not limited to that of the embodiment defined by the reference symbol.

DESCRIPTION OF THE EMBODIMENTS (Configuration)

Figure 1:
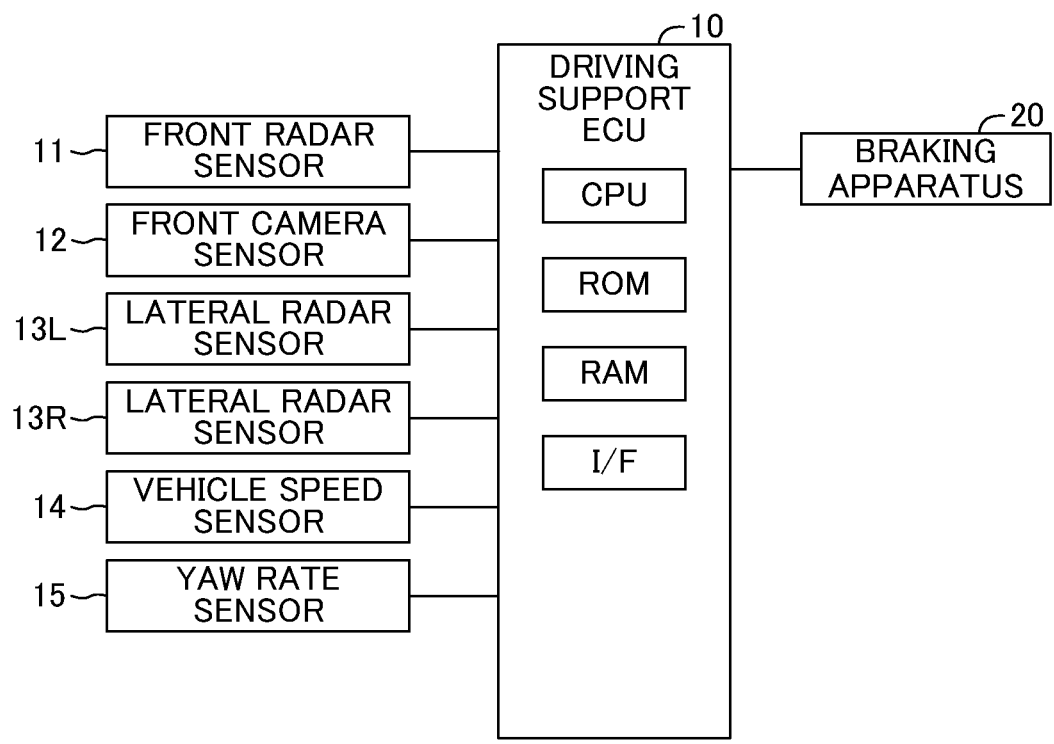
FIG. 1 is a schematic configuration diagram of a driving support apparatus according to an embodiment of the present invention.

Hereinafter, a driving support apparatus (hereinafter, referred to as "present embodiment apparatus") according to an embodiment of the present invention is described with reference to the drawings. As shown in FIG. 1, the present embodiment apparatus includes a driving support ECU 10, and a front radar sensor 11, a front camera sensor 12, a lateral radar sensor 13L, a lateral radar sensor 13R, a vehicle speed sensor 14, a yaw rate sensor 15, and a braking apparatus 20, all of which are connected to the driving support ECU 10. The driving support ECU 10 includes a microcomputer as a main component. ECU stands for Electronic Control Unit. The microcomputer includes CPU, ROM, RAM, and interfaces (I/F), and the CPU realizes various functions by executing instructions (programs, routines) stored in the ROM. Some of these functions may also be executed by non-illustrated another ECU. Hereinafter, a vehicle in which the present embodiment apparatus is mounted is referred to as an "own vehicle."

The driving support ECU 10 is configured to acquire signals output or generated by these sensors 11 to 15 every time a predetermined interval/time elapses and to controls the braking apparatus 20 based on the acquired signals to execute autonomous braking control. Hereinafter, the driving support ECU 10 may also be simply referred to as "ECU 10."

Figure 2:
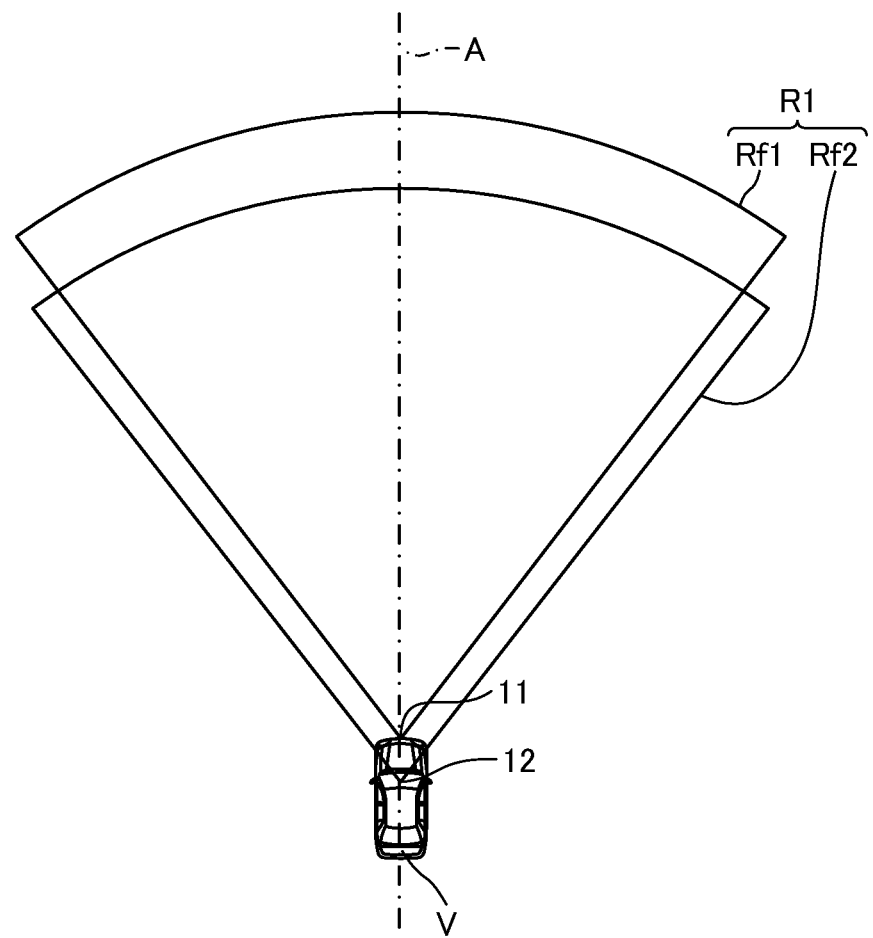
FIG. 2 is a diagram for illustrating detection areas of a front radar sensor and a front camera sensor.

As shown in FIG. 2, the front radar sensor 11 is installed on a center portion of a front bumper of the own vehicle. The front radar sensor 11 has functions of detecting an object present in a predetermined front area (described later) that includes a direct front of the own vehicle, and acquiring information on the detected object. Specifically, the front radar sensor 11 emits radio waves in a millimeter wave band to the front area of the own vehicle, and when an object is present, receives reflected waves from that object. The front radar sensor 11 calculates presence/absence of an object, as well as a relative relationship between the own vehicle and the object based on emission timings and reception timings of the radio waves, and so on. Here, the "relative relationship between the own vehicle and an object" includes a relative speed and a relative position (distance and orientation) of the object with respect to the own vehicle, and the like. Note that objects include moving objects (such as moving vehicles and pedestrians) and stationary objects (such as stationary vehicles and pedestrians, as well as guardrails and median strips).

An area Rf1 shown in FIG. 2 represents an area (detection area) within which the front radar sensor 11 is capable of detecting an object. The area Rf1 is symmetric (line-symmetric) with respect to a front-rear axis A of the own vehicle. In the present embodiment, a radar sensor with a horizontal field of view substantially equivalent to a human's field of vision (more precisely, an effective field of view) is adopted for the front radar sensor 11. In other words, the area Rf1 is positioned at the front area including the direct front of the own vehicle (strictly, an area from a diagonally left front to a diagonally right front of the own vehicle). In the present specification, the own vehicle and each area are illustrated in different scales in order to make the drawings easily visible.

The front camera sensor 12 is installed on a back surface of an inner mirror (rearview mirror) of the own vehicle. The front camera sensor 12 has function of acquiring information on an object present in a predetermined front area (described later) that includes the direct front of the own vehicle. Specifically, the front camera sensor 12 captures an image of a scenery ahead of the own vehicle, and calculates the presence/absence of an object, as well as the relative relationship between the own vehicle and the object based on the captured image data.

An area Rf2 shown in FIG. 2 represents an area within which the front camera sensor 12 is capable of detecting an object. The area Rf2 is symmetric with respect to the front-rear axis A. In the present embodiment, a camera sensor with a horizontal field of view substantially equivalent to the human's field of view (more precisely, the effective field of view) is adopted for the front camera sensor 12. In other words, the area Rf2 is positioned at the front area including the direct front of the own vehicle (strictly, an area from a diagonally left front to a diagonally right front of the own vehicle). The area Rf1 and the area Rf2 largely overlap in the front of the own vehicle. Note that the horizontal fields of view of the front radar sensor 11 and the front camera sensor 12 may be the same or different.

The front radar sensor 11 detects an object present in the area Rf1 and outputs the information on that object to the ECU 10 as "radar front object information." The front camera sensor 12 detects an object present in the area Rf2 and outputs the information on that object to the ECU 10 as "camera front object information." Hereinafter, the front radar sensor 11 and/or the front camera sensor 12 may be collectively referred to as "front sensor 11 and/or 12," and an area defined by an outer contour of the area Rf1 and the area Rf2 may be collectively referred to as "first area R1."

Figure 3:
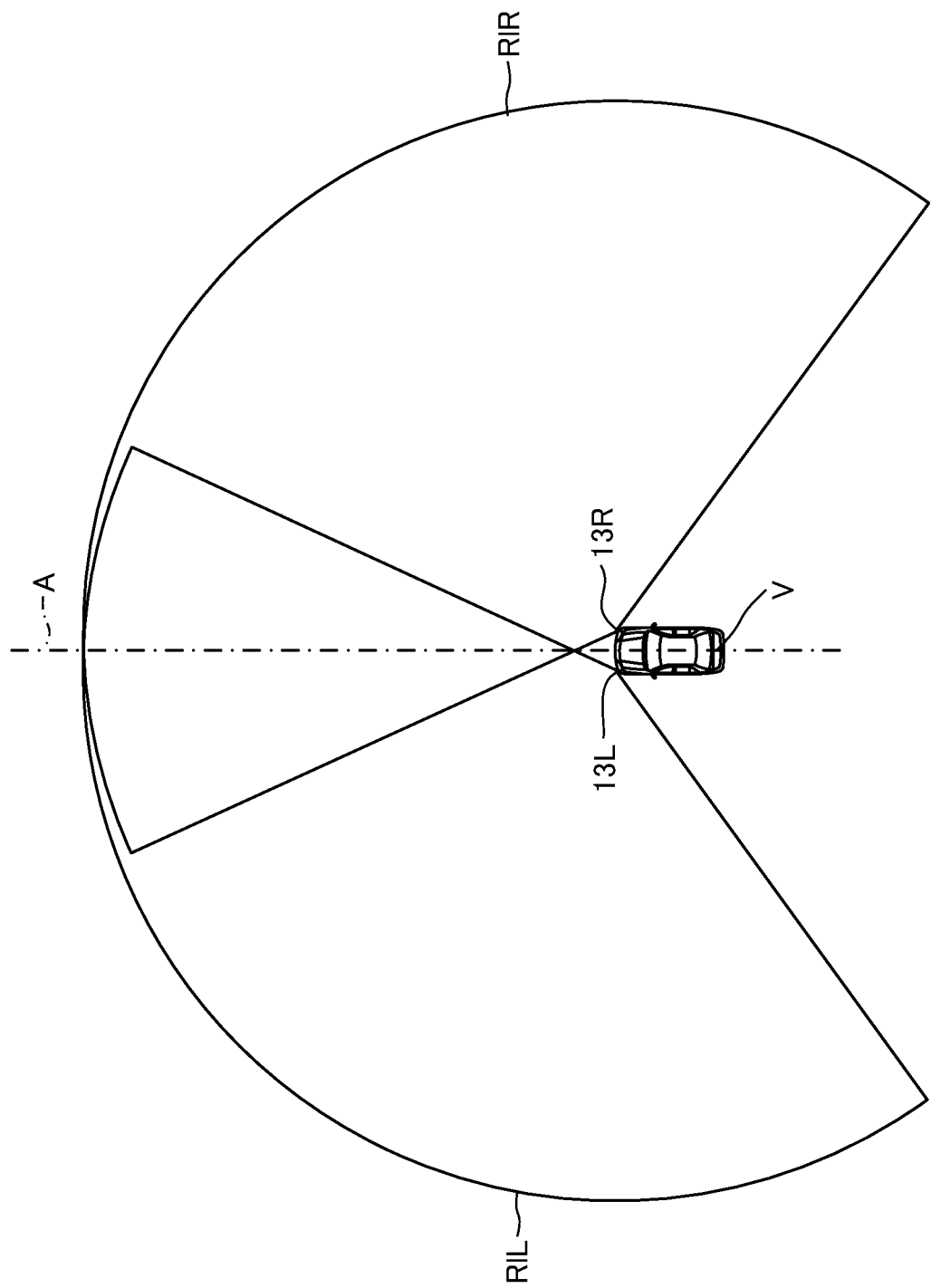
FIG. 3 is a diagram for illustrating detection areas of lateral radar sensors.

As shown in FIG. 3, the lateral radar sensor 13L is installed at a left corner portion of the front bumper of the own vehicle. The lateral radar sensor 13L has function of acquiring information on an object present in predetermined front area and left lateral area (described later) including a left front lateral area of the own vehicle. The lateral radar sensor 13R is installed at a right corner portion of the front bumper of the own vehicle. The lateral radar sensor 13R has function of acquiring information on an object present in predetermined front area and right lateral area (described later) including a right front lateral area of the own vehicle. Both of the lateral radar sensors 13L and 13R calculate the presence/absence of an object as well as the relative relationship between the own vehicle and the object in a manner similar to that of the front radar sensor 11. Each of the lateral radar sensors 13L and 13R corresponds to one example of a "lateral sensor."

Areas R|L and R|R shown in FIG. 3 respectively represent areas within which the lateral radar sensors 13L and 13R are capable of detecting an object. The areas R|L and R|R are symmetric with respect to the front-rear axis A. In the present embodiment, radar sensors each having the same performance with a horizontal field of view greater than the horizontal fields of view of the front sensors 11 and 12 are adopted for the lateral radar sensors 13L and 13R. In other words, the area R|L is positioned at the front area and the left lateral area including the left front lateral area of the own vehicle (strictly, an area from a front to a diagonally left rear of the own vehicle), and the area R|R is positioned at the front area and the right lateral area including the right front lateral area of the own vehicle (strictly, an area from the front to a diagonally right rear of the own vehicle). The areas R|L and R|R partially overlap in the front of the own vehicle. Additionally, as evident from a comparison between FIG. 2 and FIG. 3, the areas R|L and R|R are positioned at more lateral sides of the own vehicle than the first area R1. Furthermore, the area R|L and the first area R1 partially overlap in an area from the front to the diagonally left front of the own vehicle, and the area R|R and the first area R1 partially overlap in an area from the front to the diagonally right front of the own vehicle. In this embodiment, the "left front lateral" area of the own vehicle means an area from the diagonally left front of the own vehicle to a vehicle width outward direction (direction orthogonal to a traveling direction and extending so as to become apart from the own vehicle), and the "right front lateral" area of the own vehicle means an area from the diagonally right front of the own vehicle to the vehicle width outward direction.

The lateral radar sensors 13L and 13R detect objects present in the areas R|L and R|R, respectively, and output the information on these objects as "front and lateral object information" to the ECU 10. The lateral radar sensors 13L and 13R are installed for a purpose of mainly detecting an object present outside of the detection area (the first area) R1 of the front sensors 11 and 12 among objects each having a possibility of the own vehicle colliding therewith.

The vehicle speed sensor 14 generates a signal corresponding to a traveling speed (vehicle speed) of the own vehicle. The ECU 10 acquires a signal generated by the vehicle speed sensor 14 and calculates a vehicle speed based on that signal.

The yaw rate sensor 15 generates a signal corresponding to a yaw rate acting on the own vehicle. The ECU 10 acquires a signal generated by the yaw rate sensor 15 and calculates a yaw rate based on that signal. In the present embodiment, a yaw rate at the time when the own vehicle is turning right is defined to be a positive value, and a yaw rate at the time when the own vehicle is turning left is defined to be a negative value.

The braking apparatus 20 is an apparatus for applying to wheels of the own vehicle braking force to brake the own vehicle. The ECU 10 controls operation of the braking apparatus 20 to regulate the braking force applied to the wheels.

(Operation Details)

Next, operation of the ECU 10 is described in detail. The ECU 10 acquires the radar front object information from the front radar sensor 11, acquires the camera front object information from the front camera sensor 12, and acquires the front and lateral object information from the lateral radar sensors 13L and 13R. The ECU 10 fuses (merges) these object information. Specifically, the ECU 10 generates single object information based on a plurality of object information of one object which is redundantly detected in at least two overlapping areas among the areas Rf1, Rf2, R|L, and R|R. This improves a detection accuracy (i.e., accuracy of object information) of a redundantly detected object. Subsequently, the ECU 10 determines, based on the fused object information, whether or not a moving object satisfies a predetermined collision condition (condition which is satisfied when there is a possibility that the own vehicle collides with the moving object), and when the collision condition is satisfied, executes the autonomous braking control for avoiding collision with or mitigating impact due to the collision with the moving object (hereinafter, a moving object satisfying the collision condition is also referred to as a "target object"). Specifically, the ECU 10 calculates a target deceleration based on the fused object information, and applies to the own vehicle braking force required to match a deceleration (current deceleration) of the own vehicle with the target deceleration, thereby executing the autonomous braking control.

Here, an area in which a driver of the own vehicle can visually recognize an object is limited to a predetermined area. Therefore, when a target object is positioned outside the area visually recognizable to the driver, the autonomous braking control may be started without the driver being aware of the presence of the target object. As a result, the driver may perceive an unnecessary increase in deceleration making the driver feel uncomfortable.

In view of the above, in this embodiment, the ECU 10 is configured to reduce a magnitude of the braking force to be applied by the autonomous braking control when a target object is positioned in an "area in which a possibility that the driver can visually recognize that target object is relatively low" as compared to when a target object is positioned in an "area in which a possibility that the driver can visually recognize that target object is relatively high." A specific description is made below. Hereinafter, a phrase of "a possibility that the driver can visually recognize the target object" is also simply referred to as "visible possibility."

Figure 4:
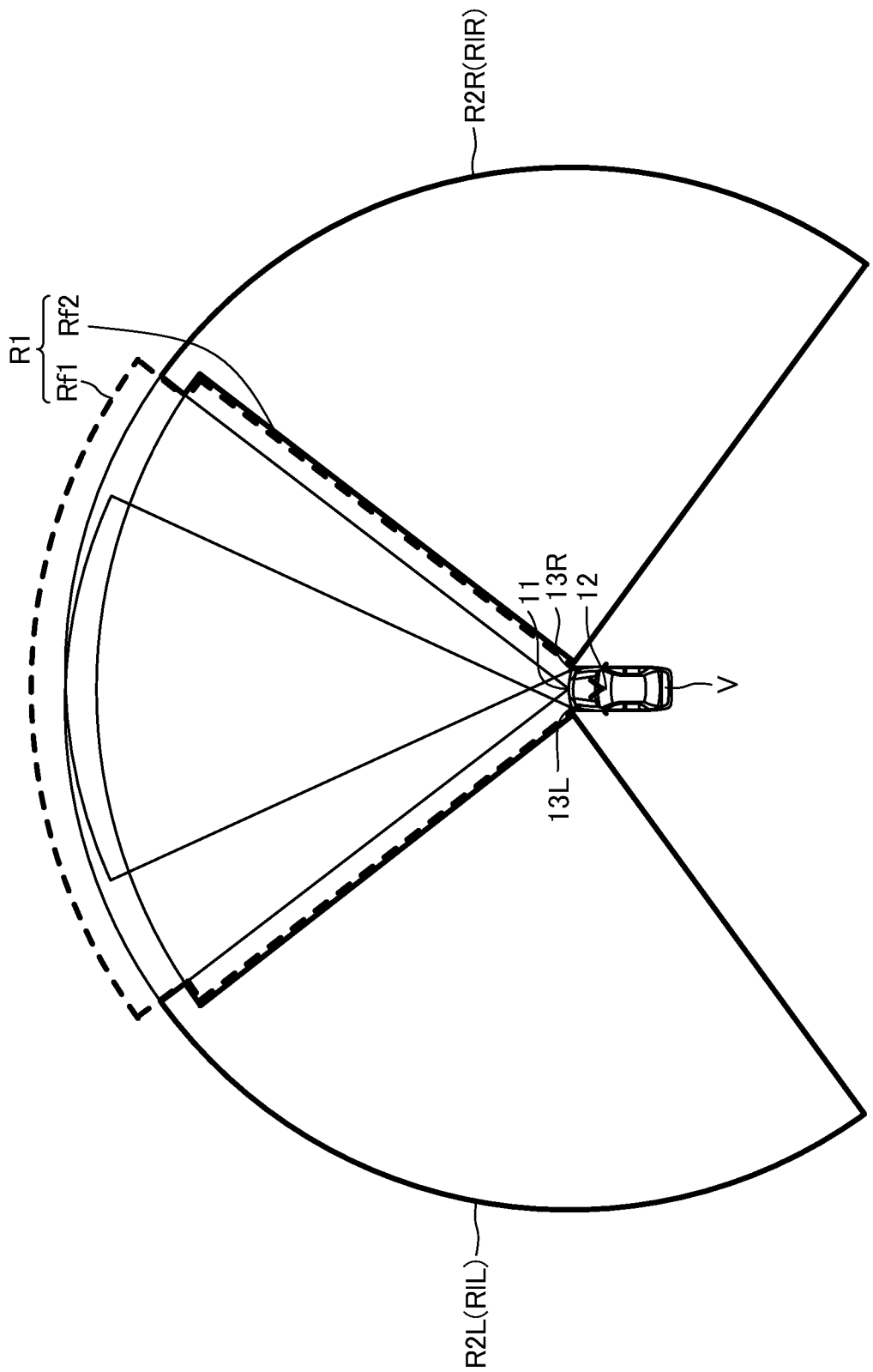
FIG. 4 is a diagram for describing a first area and a second area.

FIG. 4 is a diagram for illustrating the areas Rf1 and Rf2, as well as the areas R|L and R|R in a superimposed manner. The first area R1 (area defined by the outer contour of the areas Rf1 and Rf2) is indicated by a thick dashed line. Hereinafter, an area of the area R|L which does not overlap with the first area R1 is also referred to as a "second area R2L," and an area of the area R|R which does not overlap with the first area R1 is also referred to as a "second area R2R." The second area R2L includes the left front lateral area of the own vehicle, and the second area R2R includes the right front lateral area of the own vehicle. In addition, hereinafter, both of the second area R2L and the second area R2R may be collectively referred to as a "second area R2." The second area R2 is indicated by a thick solid line. As apparent from the above description, an area within which the front sensors 11 and 12 can detect an object (including a moving object) coincides with the first area R1 (that is, the area includes the first area R1 but does not include the second area R2). On the other hand, an area within which the lateral radar sensors 13L or 13R can detect an object includes the second area R2 as one part thereof (that is, the area includes at least the second area R2).

Hereinafter, a moving object present in the first area R1 is also referred to as a "first object." The first object is detected by the front sensor 11 or 12 (depending on a position of the first object, the first object may also be detected by the lateral radar sensor 13L or 13R). The first area R1 is positioned in the front area including the direct front of the own vehicle. Especially, in the present embodiment, the areas Rf1 and Rf2 constituting the first area R1 both have the horizontal angle of view substantially equivalent to the human's field of view. Therefore, a possibility that the driver can visually recognize the first object is extremely high. Additionally, hereinafter, a moving object present in the second area R2 is also referred to as a "second object." The second object is detected only by the lateral radar sensor 13L or 13R. The second area R2 is positioned in the lateral areas including the front lateral areas of the own vehicle. Especially, in the present embodiment, the second area R2 is positioned outside of the human's field of view. Therefore, a possibility that the driver can visually recognize the second object is extremely low. Based on this configuration, when a target object is the second object (in other words, when a target object is detected only by the lateral radar sensor 13L or 13R), the ECU 10 is configured to determine that the target object is positioned in an "area with a relatively low visible possibility". Note that, in the specification, "driver's field of view" means a field of view at the time when a central direction of the driver's vision coincides with the traveling direction of the own vehicle.

The autonomous braking control includes PB control (Pre-collision Brake control), and LPB control (Light Pre-collision Brake control), a braking degree thereof being lighter than a braking degree of the PB control. The LPB control is configured such that a maximum value of a magnitude of the target deceleration thereof is smaller compared to the PB control. In other words, the LPB control is configured such that a magnitude of the braking force thereof applied to the own vehicle is smaller compared to the PB control. Furthermore, in this embodiment, the LPB control is configured such that a jerk (i.e., a rate of change of the deceleration of the own vehicle during a period in which the deceleration reaches the target deceleration) thereof is more moderate compared to the PB control.

The ECU 10 executes the PB control when a target object is the first object and executes the LPB control when a target object is the second object. With this configuration, the LPB control is executed when a target object is positioned in the "area with a relatively low visible possibility (extremely low visible possibility in this embodiment)". That is, braking force having a relatively small magnitude is applied to the own vehicle (because the magnitude of the target deceleration is set to a relatively small value), and the deceleration changes relatively moderately. As a result, the magnitude of the deceleration does not increase significantly, and its jerk is small as well. Therefore, even though the LPB control is initiated without the driver being aware of the presence of the target object, a possibility that the driver feels uncomfortable against an increase in the deceleration due to the LPB control can be reduced. Additionally, the PB control is executed when a target object is positioned in the "area with a relatively high visible possibility (extremely high visible possibility in this embodiment)". In this case, since the driver is aware of the presence of the target object, the driver is likely to anticipate that the PB control is to be executed. Therefore, even though the PB control is initiated, a possibility that the driver feels uncomfortable against an increase in the deceleration due to the PB control is extremely low. Thus, the present embodiment apparatus makes it possible to reduce a possibility that the driver of the own vehicle feels uncomfortable against an increase in the deceleration due to the autonomous braking control, while appropriately executing the autonomous braking control.

As typical scenes where the own vehicle is likely to collide with a "moving object present in an area with a relatively low visible possibility", the following examples can be illustrated. The first example is a scene immediately after the own vehicle starts from a parking lot or a parking space. The second example is a scene immediately after the own vehicle starts after temporarily stopping at a poorly visible intersection. The third example is a scene in which immediately after a light of a traffic signal for an own vehicle's lane has switched to blue at an intersection and the own vehicle starts, an other vehicle traveling on a crossing lane (lane crossing with an own vehicle's lane) disregards a traffic signal to approach the own vehicle. In these examples, the vehicle speed is relatively low because the own vehicle has just started moving forward from a stop state. When the PB control is executed at such a timing, there is a possibility that the driver strongly feels uncomfortable against the increase in the deceleration. Additionally, in the scene of the first example, there may be a case in which the driver and other occupants have not fastened their seat belts yet or a driving position is not stable. When the PB control is executed in such a case, there is a possibility that the driver hits his/her head against a steering wheel or the other occupants strongly hit their heads against interior walls inside the own vehicle. The present embodiment apparatus makes it possible to significantly reduce a possibility that situations mentioned above occur because under such conditions, the LPB control is executed.

Next, the collision condition is described. The ECU 10 determines whether or not the collision condition is satisfied for a moving object, among moving objects included in the fused object information, having a possibility of crossing with the own vehicle (hereinafter, also referred to as an "crossing object"). Whether or not a moving object is an crossing object is determined as follows. That is, the ECU 10 calculates a turning radius r of the own vehicle based on the vehicle speed v acquired from the vehicle speed sensor 14 and the yaw rate y acquired from the yaw rate sensor 15, and calculates a trajectory of the own vehicle based on that turning radius r. Further, the ECU 10 calculates a trajectory of a moving object based on a positional transition of the moving object. When the trajectory of the own vehicle and the trajectory of the moving object intersect, the ECU 10 determines that the moving object is an crossing object.

The collision condition is composed of a predetermined premise condition and a predetermined time condition. The premise condition is common regardless of a type of an crossing object (first object or second object). On the other hand, the time condition includes a first time condition set for the first object, and a second time condition set for the second object. Hereinafter, a collision condition composed of the premise condition and the first time condition is also referred to as a "first collision condition," and a collision condition composed of the premise condition and the second time condition is also referred to as a "second collision condition."

The premise condition is satisfied when all of the following conditions 1 to 7 are satisfied.
  (Condition 1) The vehicle speed v is more than or equal to a predetermined vehicle speed threshold vth.
  (Condition 2) The yaw rate y is less than a predetermined yaw rate threshold yth.
  (Condition 3) The turning radius r is more than or equal to a predetermined turning radius threshold rth.
  (Condition 4) An angle formed by a speed vector of the own vehicle and a speed vector of the crossing object is within a predetermined angle range.
  (Condition 5) A collision-predicted position on the own vehicle with the crossing object is within a predetermined positional range.
  (Condition 6) The condition 5 is satisfied over a plurality of consecutive periods/intervals.
  (Condition 7) The crossing object is not a ghost.

The vehicle speed threshold vth of the condition 1 is set to a value at which the condition 1 becomes satisfied when the own vehicle is not in a stop state. The yaw rate threshold yth of the condition 2 and the turning radius threshold rth of the condition 3 are respectively set to values at which the conditions 2 and 3 becomes satisfied when the own vehicle is traveling on a straight or a nearly straight trajectory. The turning radius threshold rth is a variable that varies depending on the vehicle speed v. The angle range of the condition 4 is set to a range within which the condition 4 becomes satisfied when the crossing object is traveling in a direction orthogonal to or nearly orthogonal to the traveling direction of the own vehicle.

Figure 5:
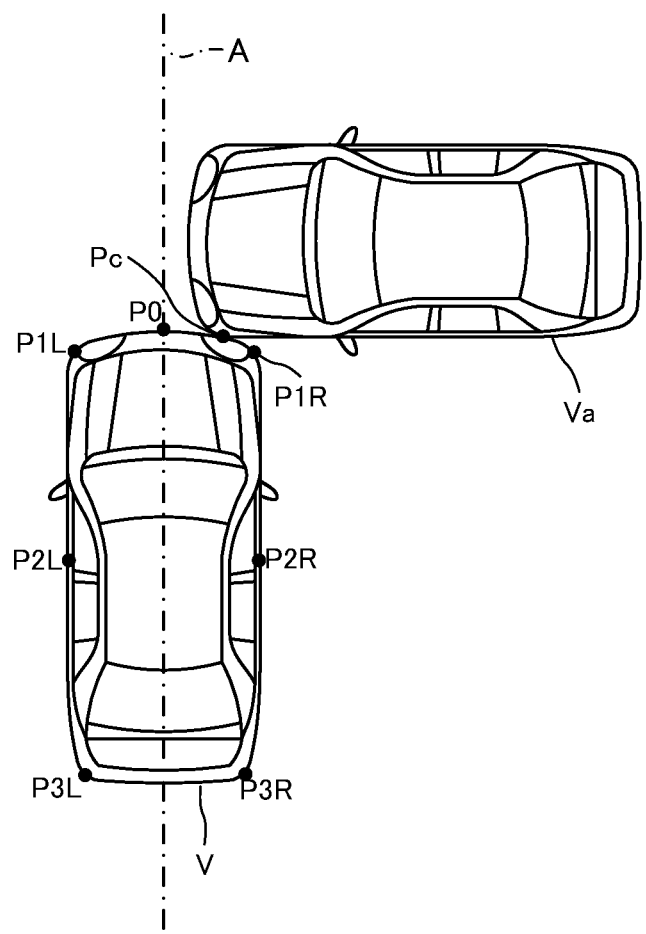
FIG. 5 is a diagram for describing a condition 5 of a premise condition.

The condition 5 is satisfied when it is determined that the own vehicle and the crossing object would collide in a case when the own vehicle maintains its current traveling state as well as the crossing object maintains its current moving state. Specific description is given with reference to FIG. 5. FIG. 5 is a diagram for predicting a positional relationship between the own vehicle V and an other vehicle Va (crossing object) at a collision timing in a case when it is determined that the own vehicle and the crossing object would collide. A position Pc represents a collision-predicted position of the own vehicle V and the other vehicle Va. Values are set in advance on an outer contour of the own vehicle V (strictly, an outer contour in a plan view), the values corresponding to positions on the outer contour. Hereinafter, a center portion (front edge center portion) of the front bumper of the own vehicle V is defined as a start point P0, and the right corner portion and the left corner portion of a rear bumper of the own vehicle V are respectively defined as a right-side end point P3R and a left-side end point P3L. In this case, the values on the outer contour of the own vehicle V increase from the start point P0 to the right-side end point P3R on a right side with respect to the front-rear axis A. That is, when defining a value at the start point P0 as a0, a value at a point P1R located at the right corner portion of the front bumper as a1, a value at a point P2R located at a center portion of a right lateral surface of a vehicle body in a front-rear direction as a2, and a value at the right-side end point P3R as a3, a relationship $a0 < a1 < a2 < a3$ holds. On the other hand, the values on the outer contour of the own vehicle V decrease from the start point P0 to the left-side end point P3L on a left side with respect to the front-rear axis A. That is, when defining a value at a point PH located at the left corner portion of the front bumper as −a1, a value at a point P2L located at a center portion of a left lateral surface of the vehicle body in the front-rear direction as −a2, and a value at the left-side end point P3L as −a3, a relationship $a0 > -a1 > -a2 > -a3$ holds.

For example, assume that the condition 5 is satisfied when the collision-predicted position Pc is positioned within a positional range from the point PH to the point P1R. In this case, in the example of FIG. 5, since the value of the position Pc satisfies −a1 or more and a1 or less, the ECU 10 determines that the condition 5 is satisfied. Note that the positional range of the condition 5 is not limited to the above range. For instance, the positional range may be set as a range from the point P2L to the point P2R, or a range from the point P3L to the point P3R.

The conditions 6 and 7 have been introduced in order to ensure that the crossing object is a solid object (i.e., in order to ensure reliability of the crossing object). Here, a "ghost" is an object which occurs when the ECU 10 mistakenly determined the position of the object due to reflection of radio waves emitted from a radar sensor at signs or the like. Whether the condition 7 is satisfied or not can be determined using well-known methods.

When the ECU 10 determines that the premise condition is satisfied thanks to the satisfaction of all the conditions 1 to 7, the ECU 10 determines whether the first time condition or the second time condition is satisfied, depending on the type of the crossing object. A sequential description is given below.

The first time condition is satisfied when all of the following conditions a1 to d1 are satisfied.
 (Condition a1) A collision-predicted time TTC (Time To Collision) is less than or equal to a predetermined first time threshold TTCth1.
 (Condition b1) A steering avoidance limit time TTS (Time To Steer) is less than or equal to a predetermined first steering time threshold TTSth1.
 (Condition c1) A braking avoidance limit time TTB (Time To Brake) is less than or equal to a predetermined first braking time threshold TTBth1.
 (Condition d1) A margin time to definite collision TCC (Time to Conclusive Collision) is less than or equal to a predetermined first margin time threshold TCCth1.

The collision-predicted time TTC of the condition a1 is a time predicted to be required for the own vehicle to collide with a moving object, and can be calculated by dividing a distance to the moving object by a relative speed. The steering avoidance limit time TTS of the condition b1 is a limit time (maximum time) within which the driver can avoid collision with the moving object by steering operation by the driver, and can be yielded by calculating by when (i.e., by how many seconds) from a current time point the steering operation should be started at a predetermined lateral acceleration in order to avoid the collision with the moving object. The braking avoidance limit time TTB of the condition c is a limit time (maximum time) within which the driver can avoid collision with the moving object by brake operation by the driver, and can be yielded by calculating by when (i.e., by how many seconds) from the current time point the brake operation should be started at a predetermined deceleration in order to avoid the collision with the moving object. The margin time to definite collision TCC of the condition d1 can be yielded by calculating by when (i.e., by how many seconds) from the current time point the moving object should start to accelerate or decelerate at a predetermined acceleration or deceleration in order to avoid the collision with the own vehicle. Each time threshold TTCth1, TTSth1, TTBth1, and TCCth1 is set in advance so as to ensure that a timing at which the first time condition is satisfied is such a timing that the occupants do not feel that the PB control has been unnecessarily initiated and that the collision with the moving object can be appropriately avoided.

The second time condition is satisfied when all of the following conditions a2 to d2 are satisfied.
 (Condition a2) The collision-predicted time TTC is less than or equal to a predetermined second time threshold TTCth2.
 (Condition b2) The steering avoidance limit time TTS is less than or equal to a predetermined second steering time threshold TTSth2.
 (Condition c2) The braking avoidance limit time TTB is less than or equal to a predetermined second braking time threshold TTBth2.
 (Condition d2) The margin time to definite collision TCC is less than or equal to a predetermined second margin time threshold TCCth2.

Each time threshold TTCth2, TTSth2, TTBth2, and TCCth2 is set in advance so as to ensure that a timing at which the second time condition is satisfied is such a timing that the occupants do not feel that the LPB control has been unnecessarily initiated and that the collision with the moving object can be appropriately avoided.

Figure 6:
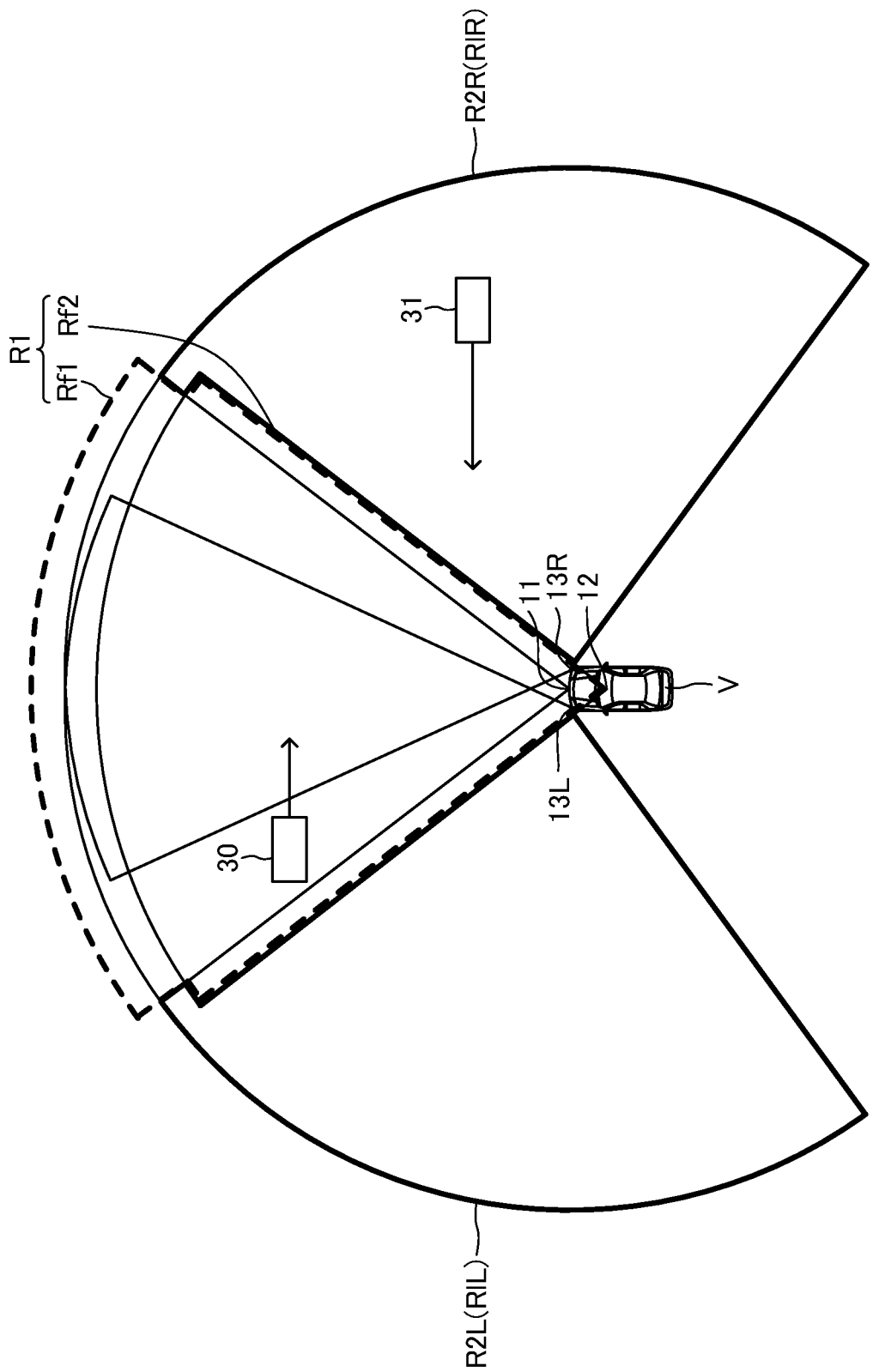
FIG. 6 is a diagram for describing a first object and a second object.

When the premise condition and the first time condition are satisfied for the first object, the ECU 10 determines that the first collision condition is satisfied and executes the PB control against the first object. On the other hand, when the premise condition and the second time condition are satisfied for the second object, the ECU 10 determines that the second collision condition is satisfied and executes the LPB control against the second object. Here, the time thresholds TTCth2, TTSth2, TTBth2, and TCCth2 of the second time condition are configured to be greater than the corresponding time thresholds TTCth1, TTSth1, TTBth1, and TCCth1 of the first time condition, respectively. With this configuration, the second time condition is satisfied at a timing earlier than the first time condition, resulting in the second collision condition being satisfied earlier than the first collision condition. In other words, the LPB control is initiated at an earlier timing than the PB control. Since the LPB control applies a relatively small magnitude of braking force to the own vehicle, a distance from a time point at which the LPB control is initiated to a time point at which the own vehicle stops is relatively long. However, with the above configuration, the collision with the target object can be appropriately avoided by means of the LPB control. In the example of FIG. 6, when an crossing object 30 (first object) satisfies the first collision condition, the ECU 10 executes the PB control against the crossing object 30, and when an crossing object 31 (second object) satisfies the second collision condition, the ECU 10 executes the LPB control against the crossing object 31.

(Specific Operation)

Figure 7:
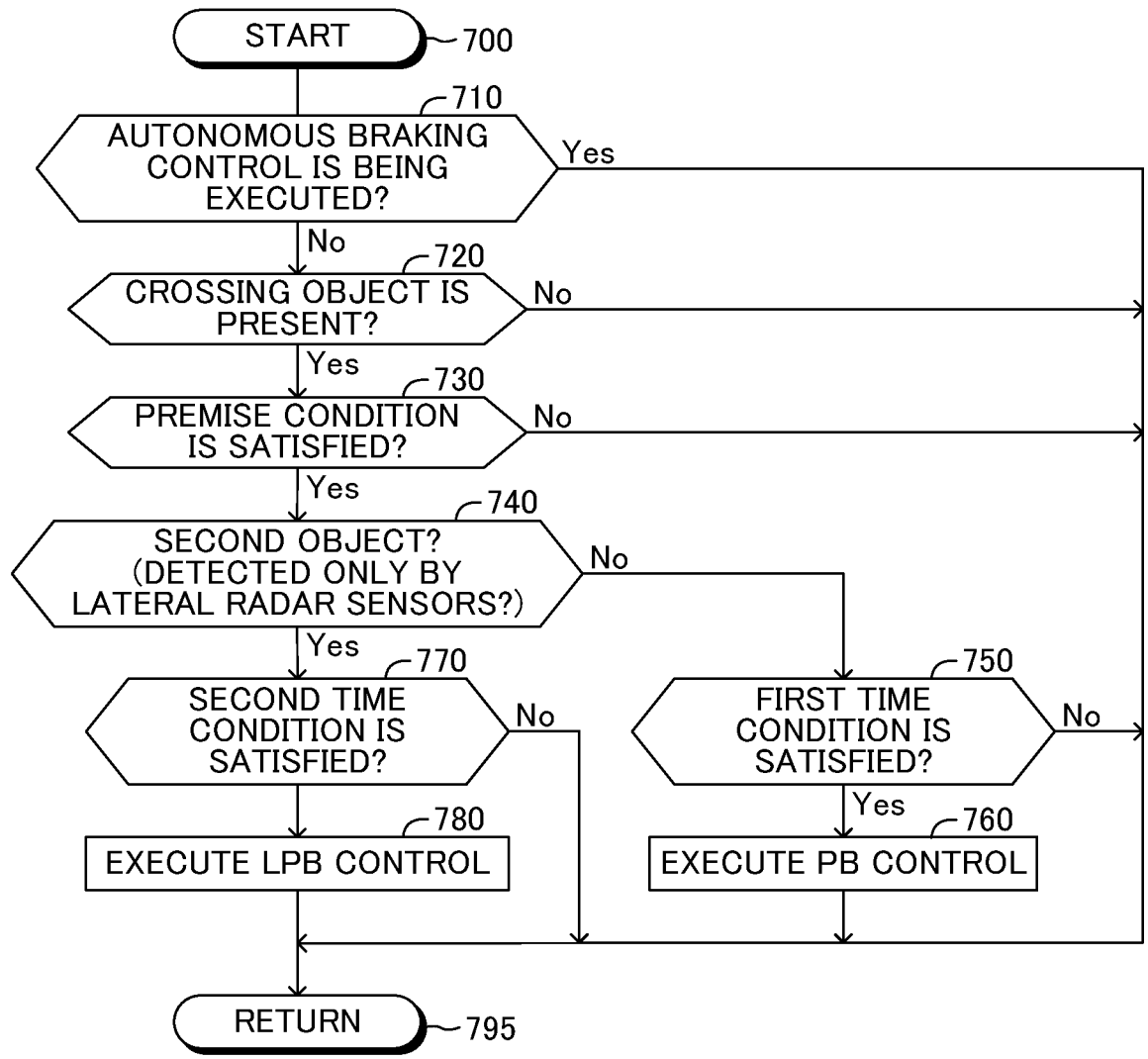
FIG. 7 is a flowchart for illustrating a routine executed by a CPU of a driving support ECU of the driving support apparatus.

Next, specific operation of the CPU of the ECU 10 is described. During a period in which an ignition switch is in an ON position, the CPU is configured to execute a routine shown by a flowchart in FIG. 7 every time a predetermined time elapses.

When a predetermined timing arrives, the CPU proceeds with processing from step 700 to step 710 to determine whether the autonomous braking control (i.e., LPB control or PB control) is being executed. When the autonomous braking control is being executed (S710: Yes), the CPU proceeds with processing to step 795 to tentatively terminate the present routine. On the other hand, when the autonomous braking control is not being executed (S710: No), the CPU proceeds with processing to step 720.

In step 720, the CPU determines whether an crossing object is present. If no crossing object is present (S720: No), the CPU determines that there is no target object present and proceeds with processing to step 795 to tentatively terminate the present routine. On the other hand, when an crossing object is present (S720: Yes), the CPU proceeds with processing to step 730.

In step 730, the CPU determines whether the premise condition is satisfied for the crossing object. When the premise condition is not satisfied (S730: No), the CPU determines that the crossing object is not a target object, and proceeds with processing to step 795 to tentatively terminate the present routine. On the other hand, when the premise condition is satisfied (S730: Yes), the CPU proceeds with processing to step 740.

In step 740, the CPU determines whether the crossing object satisfying the premise condition is the second object (i.e., a moving object detected only by the lateral radar sensor 13L or 13R). When the crossing object is not the second object (S740: No), the CPU determines that the crossing object is the first object (i.e., a moving object detected at least by the front sensors 11 and 12), and proceeds with processing to step 750.

In step 750, the CPU determines whether the first time condition is satisfied for the crossing object. When the first time condition is satisfied (S750: Yes), the CPU determines that the crossing object is a target object satisfying the first collision condition, and proceeds with processing to step 760 to execute the PB control. Thereafter, the CPU proceeds with processing to step 795 to tentatively terminate the present routine. On the other hand, when the first time condition is not satisfied (S750: No), the CPU determines that the crossing object is not a target object, and proceeds with processing to step 795 to tentatively terminate the present routine. In other words, the PB control is not executed.

In contrast, when the crossing object satisfying the premise condition is the second object (S740: Yes), the CPU proceeds with processing to step 770, and determines whether the second time condition is satisfied for the crossing object. When the second time condition is satisfied (S770: Yes), the CPU determines that the crossing object is a target object satisfying the second collision condition, and proceeds with processing to step 780 to execute the LPB control. Thereafter, the CPU proceeds with processing to step 795 to tentatively terminate the present routine. On the other hand, when the second time condition is not satisfied (S770: No), the CPU determines that the crossing object is not a target object, and proceeds with processing to step 795 to tentatively terminate the present routine. In other words, the LPB control is not executed.

The driving support apparatus, the driving support method, and the non-transitory computer-readable storage medium according to the embodiment have been described above. However, the present invention is not limited to the embodiment described above, and various variations can be made as long as such variations do not depart from the object of the present invention.

Figure 8:
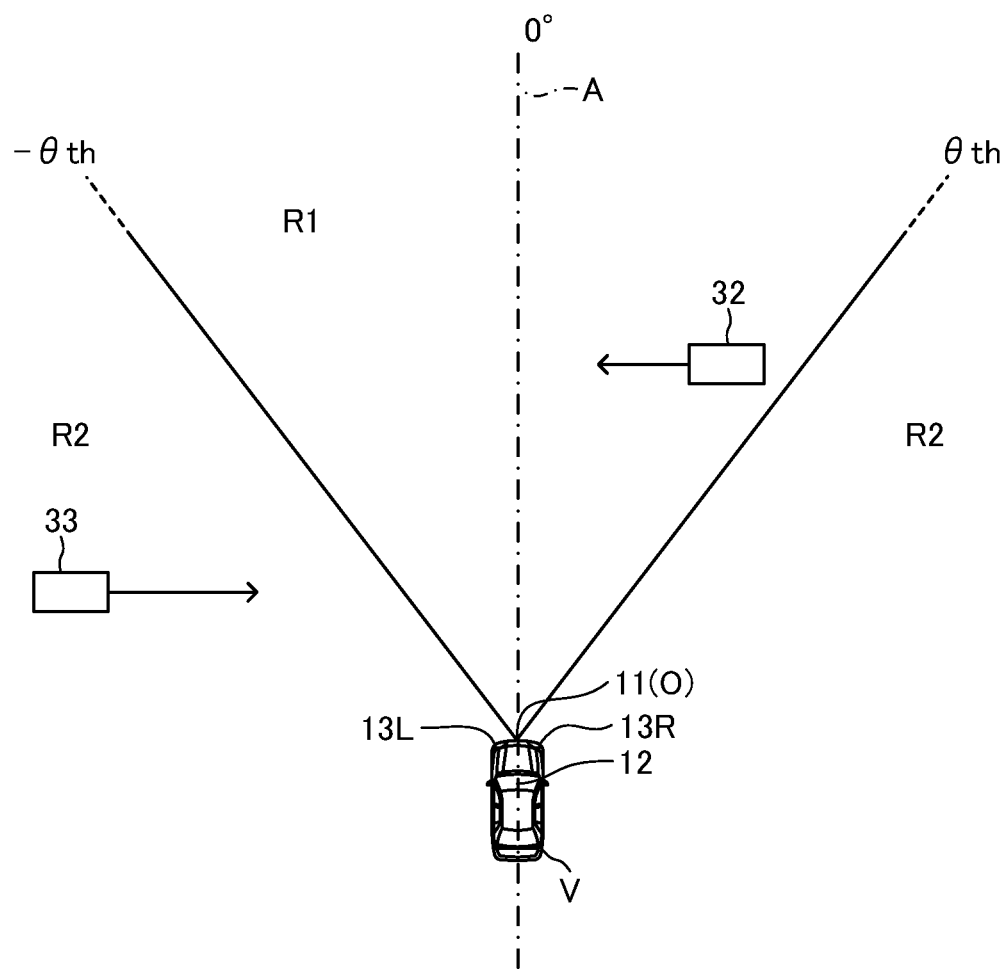
FIG. 8 is a diagram for describing another example of a first area and a second area.

For example, the positions and shapes of the first area R1 and the second area R2 are not limited to the configuration described in the embodiment. For instance, as shown in FIG. 8, an orientation of the front-rear axis A may be set to a reference orientation (azimuth angle 0°). An area in which a magnitude of an azimuth angle at a time when viewed from an origin O which is set at the center portion (front edge center portion) of the front bumper of the own vehicle V is less than or equal to a predetermined angle threshold θth may be defined as the first area R1. An area in which the magnitude of the azimuth angle is larger than the angle threshold θth may be defined as the second area R2. In this case, when the crossing object 32 (first object) satisfies the first collision condition, the PB control is executed, and when the crossing object 33 (second object) satisfies the second collision condition, the LPB control is executed.

Figure 9:
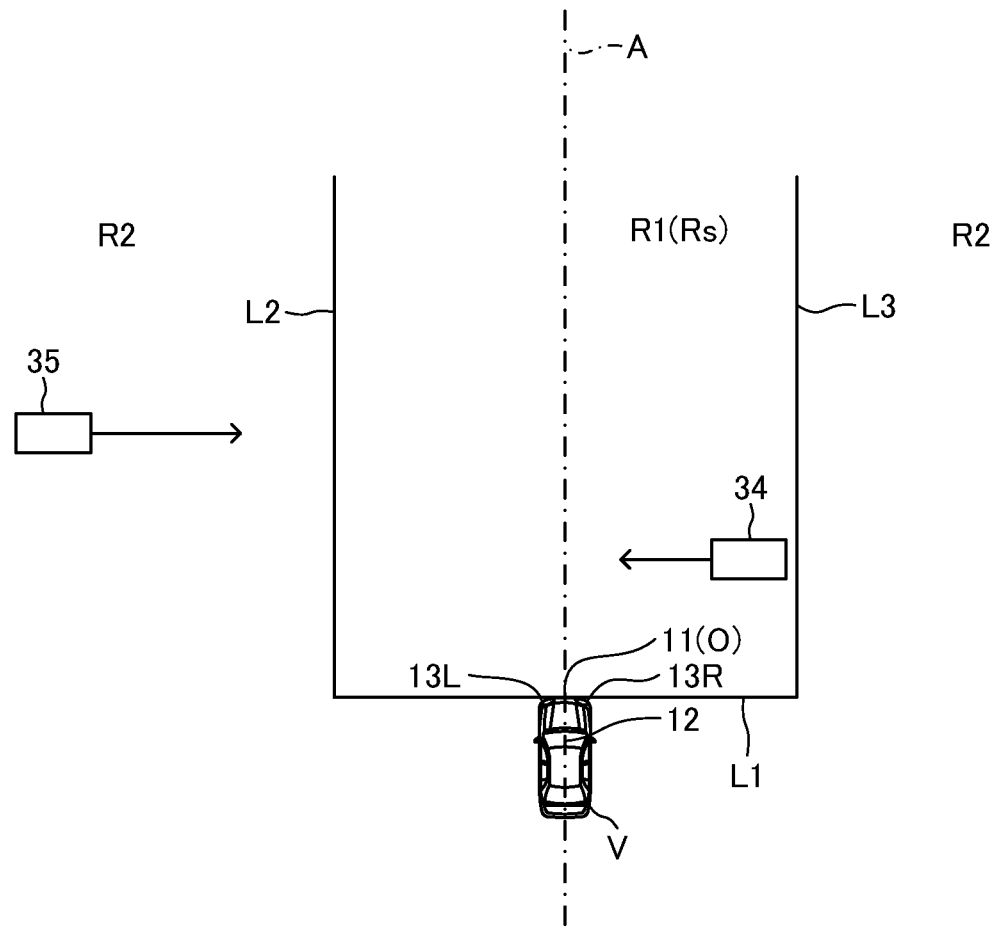
FIG. 9 is a diagram for describing further another example of a first area and a second area.

Alternatively, as shown in FIG. 9, an area which is positioned in front of the own vehicle V and is defined by a line segment L1, a half-line L2, and a half-line L3 may be defined as a specific area Rs, where the line segment L1 is a line segment passing through the origin O in a vehicle width direction and being arranged so as to be symmetric with respect to the front-rear axis A, the half-line L2 is a half-line extending from a left end of the line segment L1 to the traveling direction of the own vehicle V, and the half-line L3 is a half-line extending from a right end of the line segment L1 to the traveling direction of the own vehicle V. The specific area Rs may be set as the first area R1, while areas positioned on left and right of the specific area Rs may be set as the second area R2. In this case, when the crossing object 34 (first object) satisfies the first collision condition, the PB control is executed, and when the crossing object 35 (second object) satisfies the second collision condition, the LPB control is executed.

Furthermore, a combination of sensors used for detecting objects is not limited to the configuration described in the embodiment. For example, the driving support apparatus may be configured to include either one of the front sensor 11 or 12. Alternatively, when the horizontal field of view of the lateral radar sensor 13L or 13R is sufficiently wide, the driving support apparatus may not include the front sensors 11 and 12. Similarly, when the horizontal field of view of the front sensor 11 or 12 is sufficiently wide, the driving support apparatus may not include the lateral radar sensor 13L or 13R. Furthermore, when a camera sensor for PVM (Panoramic View Monitor) that is pre-installed in the own vehicle has a capability of appropriately detecting an object that satisfies the collision condition, the driving support apparatus may be configured to include only this PVM camera sensor. Additionally, when an ultrasonic sensor for ICS (Intelligent Clearance Sonar) that is pre-installed in the own vehicle has a capability of appropriately detecting an object that satisfies the collision condition, the driving support apparatus may be configured to include only this ICS ultrasonic sensor. Moreover, a type of sensors is not limited to a radar sensor or a camera sensor, and other sensors such as Lidar or a laser radar may be used.

Furthermore, a maximum value of the magnitude of the target deceleration for the LPB control may not be a fixed value, and may be configured to vary depending on a distance to the target object. The same applies to the jerk for the LPB control.

Furthermore, the present invention can also be applied to vehicles (so-called autonomous vehicles) that travel by means of autonomous driving (autonomous driving control).

What is claimed is:

1. A driving support apparatus, comprising:
a surrounding sensor capable of detecting a first object and a second object, the first object being a moving object present in a predetermined first area including a direct front of an own vehicle, and the second object being a moving object present in a predetermined second area including front lateral areas of the own vehicle, wherein,
with respect to a reference orientation defined with respect to a front-rear axis of the own vehicle,
the first area is positioned in an area within which a magnitude of an azimuth angle at a front edge center portion of the own vehicle is less than or equal to a predetermined angle threshold with respect to the reference orientation, and
the second area is positioned in an area within which a magnitude of an azimuth angle from the front edge center portion is larger than the angle threshold with respect to the reference orientation; and
a control unit configured to execute autonomous braking control for automatically applying braking force to the own vehicle when a collision condition is satisfied, the collision condition being satisfied in a case when there is a possibility that the own vehicle collides with a moving object, wherein,
the control unit is configured to, when a target object which is a moving object satisfying the collision condition is in the second area, reduce a magnitude of the braking force applied by the autonomous braking control, as compared to when the target object is in the first area.

2. The driving support apparatus according to claim 1, wherein
the collision condition includes a condition that a collision-predicted time is less than or equal to a predetermined time threshold, the collision-predicted time being a time predicted to be required for the own vehicle to collide with a moving object, and
the time threshold at a time when the target object is in the second area is larger than the time threshold at a time when the target object is in the first area.

3. The driving support apparatus according to claim 1, wherein
the surrounding sensor includes a front sensor and a lateral sensor,
an area within which the front sensor is capable of detecting a moving object includes the first area, but does not include the second area, and
an area within which the lateral sensor is capable of detecting a moving object includes at least the second area.

4. The driving support apparatus according to claim 1, wherein
a specific area is positioned in front of the own vehicle defined by a first line, a second line, and a third line, the first line having a predetermined length, passing through the front edge portion of the own vehicle in a vehicle width direction, and being arranged symmetric with respect to the front-rear axis of the own vehicle, the second line extending from a left end of the first line to a traveling direction of the own vehicle or to a diagonally left front direction, and the third line extending from a right end of the first line to a traveling direction of the own vehicle or to a diagonally right front direction,
the first area is positioned in the specific area, and
the second area is positioned in a predetermined area excluding the specific area.

5. The driving support apparatus according to claim 1, wherein
the control unit is configured to:
when the collision condition is satisfied, execute the autonomous braking control by applying to the own vehicle braking force required to match a deceleration of the own vehicle with a target deceleration as the braking force; and
when the target object is in the second area, moderate a rate of change of the deceleration during a period in which the deceleration reaches the target deceleration, as compared to when the target object is in the first area.

6. A driving support method, comprising:
detecting a first object and a second object, the first object being a moving object present in a predetermined first area including a direct front of an own vehicle, and the second object being a moving object present in a predetermined second area including front lateral areas of the own vehicle, wherein,
with respect to a reference orientation defined with respect to a front-rear axis of the own vehicle,
the first area is positioned in an area within which a magnitude of an azimuth angle at a front edge center portion of the own vehicle is less than or equal to a predetermined angle threshold with respect to the reference orientation, and
the second area is positioned in an area within which a magnitude of an azimuth angle from the front edge center portion is larger than the angle threshold with respect to the reference orientation;

executing autonomous braking control for automatically applying braking force to the own vehicle when a collision condition is satisfied, the collision condition being satisfied in a case when there is a possibility that the own vehicle collides with a moving object; and when a target object which is a moving object satisfying the collision condition is in the second area, reducing a magnitude of the braking force applied by the autonomous braking control, as compared to when the target object is in the first area.

7. A non-transitory computer-readable storage medium storing a driving support program for causing a computer to execute processing comprising:

detecting a first object and a second object, the first object being a moving object present in a predetermined first area including a direct front of an own vehicle, and the second object being a moving object present in a predetermined second area including front lateral areas of the own vehicle, wherein, with respect to a reference orientation defined with respect to a front-rear axis of the own vehicle, the first area is positioned in an area within which a magnitude of an azimuth angle at a front edge center portion of the own vehicle is less than or equal to a predetermined angle threshold with respect to the reference orientation, and the second area is positioned in an area within which a magnitude of an azimuth angle from the front edge center portion is larger than the angle threshold with respect to the reference orientation;

executing autonomous braking control for automatically applying braking force to the own vehicle when a collision condition is satisfied, the collision condition being satisfied in a case when there is a possibility that the own vehicle collides with a moving object; and when a target object which is a moving object satisfying the collision condition is in the second area, reducing a magnitude of the braking force applied by the autonomous braking control, as compared to when the target object is in the first area.

* * * * *